United States Patent [19]

Rosback

[11] 3,878,127

[45] Apr. 15, 1975

[54] METHOD OF MANUFACTURING A ZEOLITIC ABSORBENT

[75] Inventor: Donald H. Rosback, Elmhurst, Ill.

[73] Assignee: Universal Oil Products Company, Des Plaines, Ill.

[22] Filed: May 2, 1973

[21] Appl. No.: 356,666

[52] U.S. Cl.......... 252/455 Z; 423/112; 260/674 SA
[51] Int. Cl............................................. B01j 11/40
[58] Field of Search........... 252/455 Z; 260/674 SA; 423/112

[56] References Cited
UNITED STATES PATENTS 3,382,039  5/1968  Calmon et al................. 252/455 Z
3,549,558  12/1970  Berry et al..................... 252/455 Z
3,558,730  1/1971  Neuzil........................... 260/674 SA Primary Examiner—C. Dees
Attorney, Agent, or Firm—James R. Hoatson, Jr.; Thomas K. McBride; William H. Page II

[57] ABSTRACT

A method of manufacturing a solid adsorbent for the separation of para-xylene from a mixture of $C_8$ aromatic hydrocarbons. The method basically comprises the steps of: ion-exchanging a precursor mass containing type X or type Y zeolite and amorphous material with an aqueous sodium hydroxide solution to effect the addition of sodium cations to the zeolite structure, ion-exchanging the sodium-exchanged mass to effect the essentially complete exchange of sodium cations, and drying the resulting material at conditions to reduce the LOI at 900°C. to less than about 10 wt. %. The sodium cations can be essentially completely exchanged with barium and potassium cations in a weight ratio of from about 1.5 to 200 or with barium alone. We have found that the sodium hydroxide exchange step produces an adsorbent that has faster adsorption-desorption rates for the desired para-xylene isomer and permits a suitable adsorbent to be produced which contains barium cations alone.

10 Claims, No Drawings

[3,878,127]

METHOD OF MANUFACTURING A ZEOLITIC ABSORBENT

BACKGROUND OF THE INVENTION

1. Field of the Invention

The field of art to which this invention pertains is crystalline aluminosilicate adsorbent production. More specifically, this invention relates to a method of manufacturing an adsorbent having characteristics desirable for the separation of para-xylene from a mixture of $C_8$ aromatic hydrocarbons from a precursor mass comprising type X or type Y zeolite and amorphous material as binder.

2. Description of the Prior Art

There are numerous methods for the manufacture and ion-exchange of various crystalline aluminosilicates, particularly the type X and type Y crystalline aluminosilicates, to yield products useful for effecting given hydrocarbon reactions or separations. In the method of this invention, a manufacturing method has been discovered whereby an adsorbent material is produced having superior properties with respect to the separation of para-xylene from a mixture of $C_8$ aromatic hydrocarbons.

U.S. Pat. Nos. 3,558,730; 3,558,732; 3,626,020; and 3,663,638 show that adsorbents comprising crystalline aluminosilicates and containing barium and potassium are useful for separating para-xylene from a mixture of $C_8$ aromatic hydrocarbons.

The treating of crystalline aluminosilicates with a caustic solution to achieve certain desired results has been recognized in the prior art. U.S. Pat. No. 3,326,797, for example, discloses a process for aqueous caustic treating of high silica zeolites having silica over alumina ratios between about 6 and 12, at treating conditions, for the sole purpose of removing a certain percentage of structural silica from the zerolite. The caustic treatment, at conditions to preferably retain a final $SiO_2/Al_2O_3$ ratio greater than about 5.5, is found to increase the adsorptive capacity of the zeolite and to increase its catalytic activity. The caustic treating process of that reference patent is concerned only with etching or leaching of silica from the zeolite structure to achieve these characteristics and neither discloses nor suggests the addition of alkali metal cations to the zeolite structure during the treating process for any reason whatever.

We have discovered that ion-exchanging precursor particles comprising a type X or type Y zeolite and amorphous material as a binder with an aqueous solution of sodium hydroxide prior to the ion exchange with potassium and barium or barium alone produces an adsorbent possessing faster adsorption-desorption rates for para-xylene when used to separate para-xylene from a mixture of $C_8$ aromatic hydrocarbons. The reasons for this is not entirely understood but it is hypothesized that the ion-exchange with aqueous sodium hydroxide replaces non-sodium cations, such as H+ or Group II-A cations, occupying exchangeable sites within the zeolite thereby permitting higher amounts of barium and potassium or barium alone to be added during a subsequent ion-exchange step.

SUMMARY OF THE INVENTION

It is, accordingly, a broad objective of my invention to provide a method of manufacturing a solid adsorbent for the separation of para-xylene from a mixture of $C_8$ aromatic hydrocarbons.

In brief summary, my invention is, in one embodiment, a method of manufacturing a solid adsorbent for the separation of para-xylene from a mixture of $C_8$ aromatic hydrocarbons which method comprises the steps of: (a) contacting a precursor mass containing type X or type Y zeolite and amorphous material with an aqueous sodium hydroxide solution at first ion-exchange conditions to effect the addition of sodium cations to the zeolite structure; (b) treating the ion-exchanged mass at second ion-exchange conditions to effect the essentially complete exchange of sodium cations; and, (c) drying the resulting exchanged mass at conditions to reduce the LOI at 900°C. to less than about 10 wt. %.

DESCRIPTION OF THE INVENTION

Since the anticipated use for the adsorbent prepared by the method of this invention is in various processes for the separation of para-xylene from a feed mixture containing $C_8$ aromatic hydrocarbons, the particular usefulness of this adsorbent and general insight into its desirable characteristics may be better understood by brief reference to those processes.

In separating para-xylene from the feed mixture, the feed is contacted with a bed or beds of the structured zeolite adsorbent and para-xylene is selectively retained by the adsorbent while the unadsorbed or raffinate mixture which comprises saturated hydrocarbons is removed from the interstitial void spaces between the particles of adsorbent and the surface of the solid adsorbent. The adsorbent is then contacted with a desorbent material which is capable of displacing the adsorbed para-xylene from the adsorbent.

The adsorbent can be contained in a single chamber where through programmed flow into and out of the chamber separation of the para-xylene isomer is effected. Processes employing swing-bed operational techniques, where a series of adsorbent chambers are available, or simulated moving-bed countercurrent operations similar to those generally disclosed in the pattern of operations in U.S. Pat. No. 2,985,589, can use the adsorbent prepared by the method of this invention.

A particularly preferred process to use the adsorbent of this invention is a continuous process for the separation of para-xylene from a mixture of $C_8$ aromatic hydrocarbons which process comprises the steps of: contacting the feed mixture with the adsorbent at adsorption conditions to effect the selective retention of para-xylene by the adsorbent, withdrawing from the bed of adsorbent a raffinate stream comprising less selectively retained $C_8$ aromatic isomers, contacting the adsorbent with a desorbent material at desorption conditions to effect desorption of para-xylene from the adsorbent, and withdrawing a stream containing para-xylene and desorbent from the adsorbent.

Preferred operating conditions of this particular process include a temperature within the range of from about 25°C. to about 150°C. and a pressure within the range of from about atmospheric to about 500 psig. Furthermore, both adsorption and desorption of the para-xylene are effected at conditions selected to maintain liquid phase throughout the bed of adsorbent.

The adsorbent produced by the method of this invention may, of course, be used in other selective adsorption processes for separating para-xylene. These might include, for instance, swing-bed processes in which both adsorption and desorption are conducted in the vapor phase or in which one operation is conducted in the vapor phase and the other in the liquid phase. Operating pressures and temperatures for adsorption and desorption might be the same or different.

The $C_8$ aromatic isomers besides para-xylene which may be found in feed streams for such adsorptive separation processes can include ortho-xylene, or meta-xylene, or ethylbenzene of all three of these isomers. Other materials that may be included in the feed streams but which are not necessarily detrimental to the performance of the adsorptive-separation processes include paraffins, olefins and naphthenes. $C_8$ aromatic-containing feed stocks from which xylenes are recovered are, generally speaking, either extracted or non-extracted. Extracted feeds are those $C_8$ aromatic extracts which have been produced by a typical solvent extraction process from a pyrolysis gasoline or from a naphtha which has been reformed with a platinum-halogen containing catalyst. Such extracted feed stocks are essentially free of non-aromatic hydrocarbons. Non-extracted feed stocks inlude $C_8$ aromatic cuts of hydrogenated pyrolysis naphtha or reformates prepared by fractionation without solvent extraction and which therefore contain varying amounts of non-aromatic hydrocarbons.

The desorbents which can be used in processes employing this adsorbent will vary depending on the type of operation employed. In the swing-bed system in which the preferably adsorbed para-xylene is removed from the adsorbent by a purge stream, gaseous hydrocarbons or other type gases may be used at elevated temperatures or reduced pressures or both to effectively purge adsorbed para-xylene from within the adsorbent. However, in other type opertions which are generally operated at substantially constant pressures and temperatures, the desorbent relied upon must be judiciously selected in order that it may displace para-xylene adsorbed from the feed within the adsorbent without unduly preventing the para-xylene from displacing the desorbent in a following adsorption cycle. In cases where liquid phase, substantially isothermal and constant pressure operations are effected, it is preferred to use an aromatic-containing desorbent. As disclosed in U.S. Pat. Nos. 3,558,732 and 3,686,342, toluene- and diethylbenzene-containing desorbents are especially preferred for this type of operation.

With the type of processes employing adsorbents to separate para-xylene now in mind, one can appreciate that certain characteristics of adsorbents are highly desirable, if not absolutely necessary, to the successful operation of the selective adsorptive process. Amoung such characteristics are: adsorptive capacity for some volume of para-xylene per volume of adsorbent; adsorption for para-xylene with respect to the other $C_8$ aromatic isomers and the desorbent; and sufficiently fast rates of adsorption and desorption of the para-xylene to and from the adsorbent.

Capacity of the adsorbent for adsorbing a specific volume of para-xylene is of course a necessity; without such capacity the adsorbent is useless for adsorptive separation. Furthermore, the higher the adsorbent's capacity for the species to be adsorbed, the better is the adsorbent. Increased capacity of a particular adsorbent makes it possible to reduce the amount of adsorbent needed to separate the desired species contained in a particular rate or hydrocarbon feed mixture. A reduction in the amount of adsorbent required for a specific adsorptive separation reduces the cost of the separation process. It is important that the good initial capacity of the adsorbent be maintained during actual use in the separation process over some economically desirable life.

The other important adsorbent characteristic is the ability of the adsorbent to separate components of the feed; or, in order words, the selectivity, (B), of the adsorbent for one component as compared to another component. Selectivity can be expressed not only for the desired $C_8$ aromatic isomer (para-xylene) as compared to undesired isomers but can also be expressed between any feed stream isomer and the desorbent. The selectivity (B) as used throughout this specification is defined as the ratio of the two components of the adsorbed phase over the ratio of the same two components in the unadsorbed phase at equilibrium conditions.

Selectivity is shown as Equation 1 below:

Equation 1

$$\text{Selectivity} - (B) = \frac{[\text{vol. percent C/vol. percent D}]A}{[\text{vol. percent C/vol. percent D}]U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The third important characteristic is the rate of exchange of the adsorbed para-xylene with the desorbent or, in other words, the relative rate of desorption of para-xylene. This characteristic relates directly to the amount of desorbent that must be employed in the process to recover the adsorbed para-xylene from the adsorbent. The adsorbent produced by the method of this invention not only has good para-xylene capacity and selectivity but has faster rates of desorption.

In order to test various adsorbents to measure the characteristics of adsorptive capacity, selectivity, and the rate of desorption, a dynamic testing apparatus is employed. The apparatus consists of an adsorbent chamber of approximately 40 cc. volume having inlet and outlet portions at opposite ends of the chamber. The chamber is contained within a temperature control means and, in addition, pressure control equipment is used to operate the chamber at a constant predetermined pressure. Attached to the outlet line of the chamber is chromatographic anaylsis equipment used to analyze the effluent stream leaving the adsorbent chamber.

A pulse test, performed using this apparatus and the following general procedure, is used to determine selectivities and other data for various adsorbent systems. The adsorbent was filled to equilibrium with a particular desorbent by passing the desorbent through the adsorbent chamber. At a convenient time, a pulse of feed containing known concentrations of a nonadsorbed paraffinic tracer (n-nonane) and of $C_8$ aromatic isomers all diluted in desorbent is injected for a duration of several minutes. Desorbent flow is resumed, and the tracer and the $C_8$ aromatics are eluted in the sequence n-nonane, m-xylene, o-xylene, ethylbenzene and p-xylene as in liquid-solid chromatographic operation. The effluent is analyzed by onstream chromatographic equipment and traces of the envelopes of corresponding component peaks are developed.

From information derived from the chromatographic traces adsorbent performance can be rated in terms of capacity index for para-xylene, selectivity for para-xylene with respect to the other $C_8$ aromatics and rate of desorption of para-xylene by the desorbent. The capacity index is characterized by the distance between the center of the para-xylene peak envelope and the $C_9$ tracer peak envelope. It is expressed in terms of the volume in cubic centimeters of desorbent pumped during this time interval. Selectivity, B, for para-xylene with respect to the other $C_8$ aromatics (p/EB, p/m, p/o) is characterized by the ratio of the distance between the center of the p-xylene peak envelope and the $C_9$ tracer peak envelope to the corresponding distances for ethylbenzene, m-xylene and o-xylene. The rate of exchange of para-xylene with the desorbent is, we have found, best characterized by the width of the $C_9$ tracer peak envelope at half intensity. The narrower the peak width the faster the desorption rate.

To translate this type of data into a practical aromatic separation process requires actual testing of the best system in a continuous countercurrent liquid-solid contacting device.

The general operating principles of such a device have been previously described and are found in Broughton U.S. Pat. No. 2,985,589 and a specific laboratory-size apparatus utilizing these principles is described in deRosset, et al., U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on adsorbent testing and evaluation may be found in the paper "Separation of $C_8$ Aromatics by Adsorption" by A. J. deRosset, R. W. Neuzil, A. J. Korous and D. H. Rosback presented at the American Chemical Society, Los Angeles, Calif. Mar. 28–Apr. 2, 1971.

The superior performance of the adsorbents prepared by the method of this invention which was indicated by the pulse test was confirmed by continuous testing in this device.

The type X structured and type Y structured zeolites as used in this specification shall include crystalline aluminosilicates having a three dimensional interconnected cage structures and can specifically be defined by U.S. Pat. Nos. 2,882,244 and 3,130,007. The terms "type X structured and type Y structured" zeolites shall include all zeolites which have a general structure as represented in the above cited patents.

The type X structured zeolite has the general empirical formula as shown in Formula 1 below:

Formula 1

$$(0.9\pm.2)M_{2/n}O:Al_2O_3:(2.5\pm0.5)SiO_2:yH_2O$$

where M represents at least one cation having a valence of not more than 3, $n$ represents the valence of M, and $y$ is a value up to about 8 depending upon the identity of M and the degree of hydration of the crystal. The cation M may be one or more of a number of cations such as the hydrogen cation, the alkali metal cations, or the alkaline earth cations or other selected cations and is generally referred to as an exchangeable site.

The type Y structured zeolites can be represented in terms of the mole oxides for the sodium form as represented by Formula 2 below:

Formula 2

$$(0.9\pm0.2)Na_2O:Al_2O_3:wSiO_2:yH_2O$$

where $w$ is a value of greater than about 3 up to 8, and $y$ may be any value up to about 9. The term "type Y zeolite" as employed herein shall refer not only to those containing sodium cations but to those containing other cations such as the hydrogen cation, the alkali metal cations or the alkaline earth cations.

The term "precursor mass" as used herein shall refer to the zeolite-containing starting material used to make final adsorbent by the method of this invention. Generally the precursor mass will be in the form of particles such as extrudates, aggregates, tablets, pills, macrospheres, or granules produced by grinding any of the above. The type X or type Y zeolite can be present in the precursor mass in concentrations generally ranging from about 75 wt. % to about 98 wt. % of the precursor mass based on volatile free composition. The remaining material in the precursor mass generally comprises amorphous silica or alumina or both which is present in intimate mixture with the zeolite material. This amorphous material may be an adjunct of the manufacturing process of the type X or type Y zeolite (for example, intentionally incomplete purification of the zeolite during its manufacture) or it may be added to the relatively pure zeolite to aid in forming particles of the zeolite.

In this specification, the volatile matter content of the zeolitic adsorbent is determined by first weighing the adsorbent, thereafter contacting the adsorbent in a high temperature furnace at 900° C. under an inert purge gas stream such as nitrogen for a period of time sufficient to achieve a constant weight. The sample is then cooled under an inert atmosphere and weighed to determine the difference in weight between the adsorbent before it was passed into the oven and afterwards. The difference in weight is calculated as a loss on ignition (LOI) and represents the volatile matter present within the adsorbent. A specific example would be a 100 gram sample of the zeolitic adsorbent placed into a muffle furnace at about 900° C. for a period of 5 to 6 hours with a dry nitrogen purge gas passing over the zeolite. The zeolite is then removed from the furnace, cooled under an inert atmosphere, and reweighed yielding a total weight of about 95 grams. On this basis, the original adsorbent can be said to have contained 5 wt. % volatile matter. The chemical analyses performed on the zeolites are based on volatile-free matter and are determined by taking into account the amount of material which is lost by determination of volatile matter and correcting the individual chemical analysis in weight percent to take this factor into consideration.

A specific precursor mass is commercially available nominal 1/16-inch extrudate comprising 13X zeolite and a minor amount of amorphous material as binder. This zeolite is primarily in the sodium form; that is, the cation represented as M in equation 3 above is primarily sodium. By chemical analysis the $Na_2O/Al_2O_3$ ratio is less than about 0.7 and is typically about 0.6 or less which, it should be noted, is less than the 0.9±0.2 indicated in formula 1 above. Other cations present, primarily as impurities, typically include H+ and any of the Group IIA metal cations. The silica to alumina ratio of this starting material by X-ray determination is about 2.5 and the same ratio by chemical analysis is about 2.6. Normally the starting material whether in the extrudate or pellet form is granulated to a particle size range of about 16–40 mesh (Standard U.S. Mesh) before the first ion exchange step is begun. This is approximately the desired particle size of the finished adsorbent.

The first ion exchange with a sodium hydroxide solution replaces non-sodium cation impurities in the zeolite-containing starting material thereby converting the type X zeolite contained in the precursor mass essentially completely to the sodium form of the type X zeolite. Increasing the sodium content of the zeolite permits a higher loading of barium and potassium cations or of the barium cation alone into the zeolite structure on a subsequent ion exchange. Although mild ion exchange conditions are employed, this step additionally removes a small amount of silica or silica and alumina. Total silica and alumina removal from the precursor mass is from about 1 to about 15% and is generally in the range of 5 to 15%. Further evidence of this is the increase in the percent zeolite, (as determined by X-ray analysis) and surface area and also the slight reduction in the $SiO_2/Al_2O_3$ ratio of the starting material. The silica or silica and alumina removed is thought to be primarily a portion of the amorphous binder whether silica or alumina or both, in the precursor mass, is evidenced by the closer agreement of the $SiO_2/Al_2O_3$ ratio of the finished adsorbent as determined by both chemical analysis and by X-ray.

To produce an acceptable adsorbent it is preferred that the sodium content of the starting material, as characterized by the weight ratio $Na_2O/Al_2O_3$ be increased to a ratio greater than about 0.70 and more preferably from about 0.75 to 1.0.

Ion exchange conditions should be so regulated to achieve this desired degree of ion exchange. The degree of ion exchange achieved is a function of the three variables of caustic concentration, temperature at which the ion exchange is conducted, and the length of time the ion exchange is continued.

The ion exchange solution employed will be sodium hydroxide dissolved in water. Suitable concentrations to obtain the desired ion exchange can be from about 0.5 to 10% by weight of sodium hydroxide with the preferred concentration being from about 0.5 to 5% by weight. By using solutions of these concentrations, the desired ion exchange can be obtained at temperatures from about 50 to 250° F. with temperatures from about 150° to 250° F. being preferred. Operating pressure is not critical and need only be sufficient to insure a liquid phase. Operating pressures can range from about atmospheric pressure to about 100 psig. The length of time required for the ion exchange will vary depending upon the solution concentration and temperature from about 0.5 to 5 hours. At the above preferred concentration and temperatures, a contact time which has been shown to be specially preferred is about 2 to 3 hours. The ion exchange step should be controlled so that the zeolite structure will not be destroyed and so that final product will have a $Na_2O/Al_2O_3$ ratio greater than about 0.7.

After the first ion exchange step the sodium exchange particles are treated at second ion-exchange conditions to effect essentially complete exchange of the sodium cations with both barium and potassium cations in a weight ratio of from about 1.5 to 200 or with barium cations alone.

Second ion exchange conditions will include a temperature of from about 50° F. to about 250° F. and a pH sufficient to preclude the formation of the hydrogen form of the zeolite. The pH will therefore be greater than 7 and preferably within the range of 7 to 10. Operation pressure is not critical and need only be sufficient to insure a liquid phase. Operating pressures can range from about atmospheric pressure to about 150 psig. The length of time for the essentially complete exchange of the sodium cations will be from about 0.5 to about 5 hours depending upon the concentration of the cation in the ion exchange medium and the temperature. The term "essentially complete exchange" as used herein shall mean that the sodium cation content has been reduced to about 2.0 wt. % or less and more preferably to about 1wt. % or less.

The preferred method of ion-exchange when the adsorbent contains both barium and potassium cations is a two-step procedure wherein the sodium-exchange particles are initially treated in contact with an aqueous solution of a potassium salt, preferably an aqueous solution of potassium chloride, for a time sufficient to reduce the sodium cations to less than about 1 wt. % of the zeolite and yield the potassium form of the zeolite. The ion-exchange is suitably accomplished on passing a 7 wt. % aqueous potassium chloride solution through a bed of the sodium exchanged particles at about 180° F. at a liquid hourly space velocity of about 1 until a total of approximately 13 pounds of solution per pound of said particles has been passed in contact therewith. The potassium-exchanged particles can then be washed with water to remove excess ion exchange solution. The washing medium wil be water which has a pH adjusted to and maintained within the range of 7 to 10 by adding small amounts of potassium hydroxide. Since the primary purpose of the sodium cation ion exchange was to remove hydrogen cation (and metal cation) contaminants, this pH range is necessary to avoid redepositing hydrogen cation on the adsorbent mass. Washing temperatures can include temperatures within the range of about 100° F. to about 200° F. with a temperature of about 100° F. to 145° F. preferred. Although the washing step can be done in a batch manner with one aliquot of wash water at a time, the washing step is generally and preferably done on a continuous flow type basis with water passed through a bed of the adsorbent at a given liquid hourly space velocity and a temperature for a period of time in order that from about 1 to about 5 gallons of water per pound of starting material is used to wash the material. Preferred washing conditions include using liquid hourly space velocities from about 0.5 to about 5, with 1.5 being preferred, to pass from about 1 to about 3 gallons of wash water per pound of starting material over the ion exchange adsorbent. The potassium-exchanged particles are treated in contact with an aqueous solution of a barium salt in the second step of the two-step ion-exchange procedure. Preferably, about a 2.4 wt. % aqueous barium chloride solution is recycled through the particle bed at about 180° F. and at a liquid hourly space velocity of about 5 until approximately 10.4 pounds of solution per pound of particles has been contacted therewith. After the barium-exchange step is completed, the water-washing step is repeated, again maintaining a pH of 7 or greater in order to prevent or minimize the possibility of formation of the hydrogen form of the zeolite. A good indication of complete washing can be made by quantitatively testing the effluent wash water for the presence of the anion portion of the salt used in the ion exchange solution.

The above-mentioned two-step potassium and barium ion-exchange procedure is not necessarily limiting as it has been found possible to employ a single step ion-exchange in which both barium and potassium are placed on the zeolite. However, the two-step procedure allows more precise control of the amount of cations placed on the zeolite. When it is desired that the sodium cations be essentially completely exchanged with only barium cations then a procedure like that of the second step of the above described two-step procedure will be used alone to effect the exchange with barium cations. I have found that by the method of this invention an adsorbent suitable for the separation of para-xylene from a $C_8$ aromatic mixture can be prepared without the potassium cations.

When the wash step is completed the wet adsorbent particles will usually contain from about 30 to about 50 wt. % volatile matter (water) as measured by loss on ignition to 900° C. The remaining step in the method of manufacture then is the drying step to reduce the LOI at 900° C. to less than about 10 wt. % with the preferred LOI being about 5 to 7 wt. %. After the washing has been completed, the particles can be unloaded and dried in a force air oven at temperatures above the boiling point of water, specifically above 300° F., for a period of time sufficient to remove enough water so that the volatile matter content of the zeolite is below about 10 wt. %. Other methods of drying may be used which can include drying in the presence of an inert gas or under a vacuum, or both.

The examples shown below are intended to illustrate one embodiment of the claimed invention and are not to be construed as unduly limiting the appended claims.

EXAMPLE 1

In this example a crystalline aluminosilicate adsorbent was prepared employing a specific method included within the scope of the appended claims.

Nominal 1/16-inch extrudate containing type 13X zeolite was ground to produce 16–40 U.S. Standard Mesh particle size material having chemical and physical properties as shown in Table No. 1 shown below:

Table No. 1

| Properties of the Starting Material | |
|---|---|
| Chemical Properties | |
| Volatile Matter (loss on ignition at 900° C.), wt. % | 3.2 |
| $SiO_2$ (volatile free) wt. % | 50.7 |
| $Al_2O_3$ (volatile free) wt.% | 33.6 |
| $Na_2O$ (volatile free) wt. % | 12.4 |
| $Na_2O/Al_2O_3$ | .61 |
| $SiO_2/Al_2O_3$ | 2.56 |
| Physical Properties | |
| Apparent Bulk Density, gm/cc | 0.635 |
| Surface Area, $M^2$/gm | 500 |
| Pore Volume, ml/gm | 0.30 |
| Pore Diameter, A | 24 |
| Area % faujasite (X-ray) | 93 |
| $SiO_2/Al_2O_3$ (X-ray) | 2.5 |

One hundred pounds of the granular starting material was loaded into an ion exchange tower against an upward flow of 1.6 wt. % NaOH solution at a rate such that the effluent temperature did not exceed 145° F. After all of the material was loaded, the material was ion exchanged by passing the 1.6 wt. % NaOH solution upflow through the ion exchange tower at a liquid hourly space velocity of 1.5 and a temperature of 200° F. until a total of 0.335 pounds of NaOH per pound of volatile-free starting material had been passed through the tower. After this first ion exchange the material was water-washed to remove excess NaOH solution by passing treated water, having a pH of 9, upflow through the tower at 1.5 LHSV and 140° F. to a total of 1.3 gallons of water per pound of volatile free starting material. Test samples of particles removed after this wash had the properties as shown in Table No. 2.

Table No. 2

| Properties of the Sodium-Exchanged Material | |
|---|---|
| Chemical Properties | |
| Volatile Matter (loss on ignition at 900° C.), wt. % | 25.4 |
| $SiO_2$ (volatile free) wt. % | 48.0 |
| $Al_2O_3$ (volatile free) wt. % | 32.1 |
| $Na_2O$ (volatile free) wt. % | 15.8 |
| $Na_2O/Al_2O_3$ | 0.81 |
| $SiO_2/Al_2O_3$ | 2.54 |
| Physical Properties | |
| Apparent Bulk Density, gm/cc | 0.671 |
| Surface area, $M^2$/gm | 516 |
| Pore volume, ml/gm | 0.27 |
| Pore diameter, A | 21 |
| Area % faujasite (X-ray) | 110 |
| $SiO_2/Al_2O_3$ (X-ray) | 2.5 |

The second ion-exchange conditions were then effected to produce a barium-potassium exchanged type X structured zeolite by the two-step procedure previously described. A potassium chloride solution was first passed over the particles at 180° F. and at one liquid hourly space velocity until a total of about 12 pounds of a 6.9 wt. % potassium chloride solution had contacted about one pound of the particle. After the ion-exchange solution had been expended the particles were essentially totally potassium exchange and were thereafter water washed at a three liquid hourly space velocity in the manner previously described until the effluent water removed from the particles was essentially chloride-free. After the water-washing step had been completed the particles were then ion exchanged with a 2.4 wt. % barium chloride solution at 180° F. The second step of the ion-exchange conditions were continued until test samples of particles removed during this step indicated that the approximate ratio of the weight of barium over potassium present within the zeolite was within the range of from about 1.5 to about 200. After the barium exchange the particles were again water washed at approximately 9 pH until the effluent water was essentially chloride free.

The washed material was then dewatered, unloaded from the ion exchange tower, and dried in a forced air oven at 570° F. to a volatile content of about 2.0 wt. %.

particles for para-xylene relative to the other $C_8$ aromatic isomers and to determine the rate of desorption of para-xylene by a particular desorbent. The feed mixture used contained 5 vol. % para-xylene, 5 vol. % meta-xylene, 5 vol. % ortho-xylene, 5 vol. % ethylbenzene, 5 vol. % of normal $C_9$ paraffin which was used as a tracer and 75 vol. % of an inert hydrocarbon material. The desorbent employed was toluene. All of the adsorbents were dried in situ to less than about 3 wt. % volatile matter as measured at 900° C.

The dynamic testing apparatus was maintained at a controlled temperature of 150° C. with sufficient pressure on the entire testing unit to maintain essentially liquid phase operations. By alternate passage of feed stock and desorbent into the testing unit and constant monitoring of the effluent from the chamber with chromatographic equipment, traces of the envelopes of component peaks were developed. From these traces data can be obtained, in the manner previously described, which will characterize various adsorbent properties.

The results of the adsorptive testing for the five adsorbents are shown in Table No. 4 below.

Table No. 4

| | | | | | Testing Results | | | |
|---|---|---|---|---|---|---|---|---|
| Adsorbent Designation | Sodium Ion Exchange | Wt. % BaO | Wt. % $K_2O$ | Wt. Ratio Ba/K | Selectivities P/EB | P/M | P/O | Peak Width in cc |
| A | yes | 20.3 | 6.1 | 3.6 | 2.23 | 2.70 | 2.13 | 9.7 |
| B | yes | 24.1 | 5.2 | 5.0 | 2.51 | 2.90 | 2.24 | 8.7 |
| C | yes | 30.1 | 0.6 | 54.1 | 2.78 | 3.12 | 2.34 | 9.4 |
| D | no | 22.0 | 5.9 | 4.0 | 2.20 | 2.89 | 2.34 | 12.2 |
| E | no | 25.7 | 2.7 | 10.3 | 2.55 | 2.65 | 2.09 | 10.9 |

Properties of the finished adsorbent are shown in Table No. 3 below.

Table No. 3

Properties of the Finished Adsorbent

Chemical Properties
| | |
|---|---|
| Volatile Matter (LOI at 900° C.) wt. % | 2.2 |
| $SiO_2$ (volatile free) wt. % | 42.1 |
| $Al_2O_3$ (volatile free) wt. % | 28.3 |
| $Na_2O$ (volatile free) wt. % | 2.0 |
| $K_2O$ (volatile free) wt. % | 6.1 |
| BaO (volatile free) wt.% | 20.3 |
| $SiO_2/Al_2O_3$ | 2.52 |

EXAMPLE II

In this example, five adsorbents were tested in a dynamic testing apparatus to illustrate desired properties achieved by the method of this invention. Adsorbent A was a sample of the adsorbent prepared in Example I above; adsorbents B and C were adsorbents prepared similar to the procedure set forth in Example I above but with different Ba/K weight ratios than that of adsorbent A; adsorbents D and E were adsorbents prepred from the starting material of Example I but without the sodium ion exchange step that was used in the preparation of adsorbents A, B, and C.

The dynamic testing apparatus and the pulse test have been previously described. The pulse test is a testing method by which certain adsorbent characteristics can be obtained.

The five adsorbents were tested using this test method to determine the selectivity of the adsorbent As can be seen from the above data in Table No. 4, all five adsorbents tested were preferentially selective for adsorbing para-xylene with respect to the other $C_8$ aromatics. As can be seen, however, the adsorbents A, B, and C prepared by the method of this invention exhibit increasing para-xylene selectivity with respect to all of the other $C_8$ aromatic isomers as the weight ratio of Ba/K increases. With adsorbents D and E, which were not prepared by the method of this invention, para-xylene ethylbenzene selectivity inceases with increasing Ba/K but para/meta and para/ortho selectivities do not. For this reason the presence of an additional cation such as potassium had therefore been found essential prior to the method of this invention to provide suitable para/meta and para/ortho selectivity to complement the para/ethylbenzene provided by the presence of the barium cation. By the method of our invention a barium-containing adsorbent having suitable para-xylene selectivities with respect to all other $C_8$ aromatic isomers can be produced without the requirement of an additional cation.

Table No. 4 also shows that the adsorbents produced by the method of this invention have faster rates of para-xylene adsorption-desorption. These relative rates can be characterized by the width of the normal $C_9$ tracer at half intensity; the narrower the peak width, the faster the adsorption-desorption rates. As shown, the tracer peak widths for adsorbents A, B and C which were prepared by the method of this invention are narrower than those for adsorbents D and E and therefore possess the faster adsorption-desorption rates.

I claim as my invention.

1. A method of manufacturing a solid adsorbent which method comprises the steps of:
   a. contacting a precursor mass containing a sodium X or Y zeolite and amorphous material having an $Na_2O/Al_2O_3$ ratio less than 0.7 with an aqueous sodium hydroxide solution at first ion exchange conditions to effect the addition of sodium cations to the zeolite structure;
   b. treating the sodium-exchanged mass at second ion exchange conditions to effect the essentially complete exchange of sodium cations with barium or barium and potassium cations; and,
   c. drying the resulting exchanged mass at conditions to reduce the LOI at 900° C. to less than about 10 wt. %.

2. The method of claim 1 further characterized in that said first ion exchange conditions include a temperature within the range of from about 50° F. to about 250° F. and a sodium hydroxide solution concentration of from about 0.5 to about 10 wt. %.

3. The method of claim 1 further characterized in that said sodium exchanged mass has a $Na_2O/Al_2O_3$ ratio greater than about 0.7.

4. The method of claim 1 further characterized in that said second ion exchange conditions include a pH sufficient to preclude formation of the hydrogen form of the zeolite, and a temperature within the range of from about 50° F. to about 250° F.

5. The method of claim 1 further characterized in that the sodium cations are essentially completely exchanged with barium and potassium cations.

6. The method of claim 5 further characterized in that the weight ratio of barium over potassium cations is from about 1.5 to 200.

7. The method of claim 1 further characterized in that cations are essentially completely exchanged with barium cations.

8. A method of manufacturing a solid adsorbent which method comprises the steps of:
   a. contacting a precursor mass comprising a sodium X or Y structured zeolite having a $Na_2O/Al_2O_3$ ratio less than about 0.7 with an aqueous sodium hydroxide solution at first ion exchange conditions, including a temperature within the range of from about 50°F. to about 250°F. and a sodium hydroxide solution concentration of from about 0.5 to about 10 wt. % to increase the sodium cation content to a $Na_2O/Al_2O_3$ ratio of greater than about 0.7;
   b. treating the sodium exchanged mass at second ion exchange conditions, including a pH sufficient to preclude the formation of the hydrogen form of the zeolite and a temperature within the range of from about 50° to about 250°F. to effect the essentially complete exchange of sodium cations with barium or barium and potassium cations; and
   c. drying the resulting exchange mass at conditions sufficient to reduce the LOI at 900°C. to less than about 10 wt. %.

9. The method of claim 8 further characterized in that the sodium cations are essentially completely exchanged with barium and potassium cations in a weight ratio of from about 1.5 to 200.

10. The method of claim 8 further characterized in that cations are essentially completely exchanged with barium cations.

* * * * *